(No Model.)
H. B. FORD.
APPARATUS FOR AND PROCESS OF THE MANUFACTURE OF SULPHUROUS OXIDE.
No. 363,457. Patented May 24, 1887.
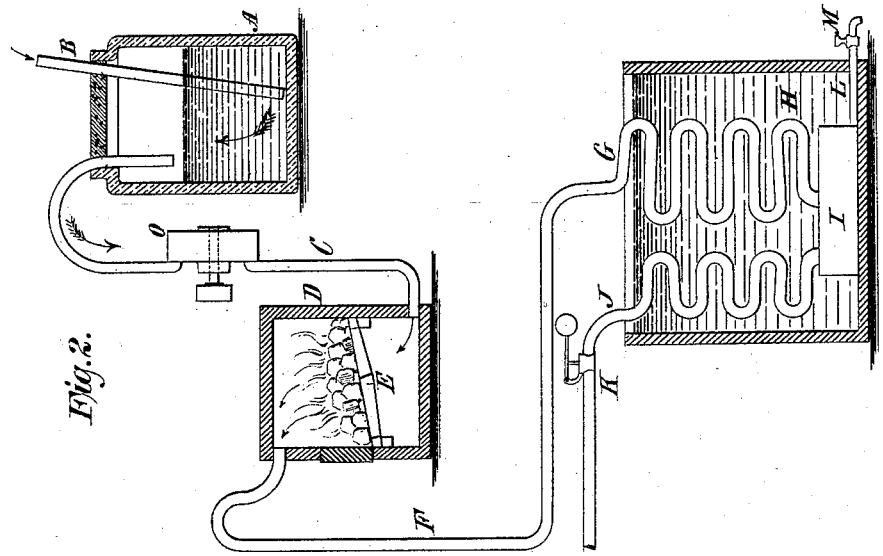
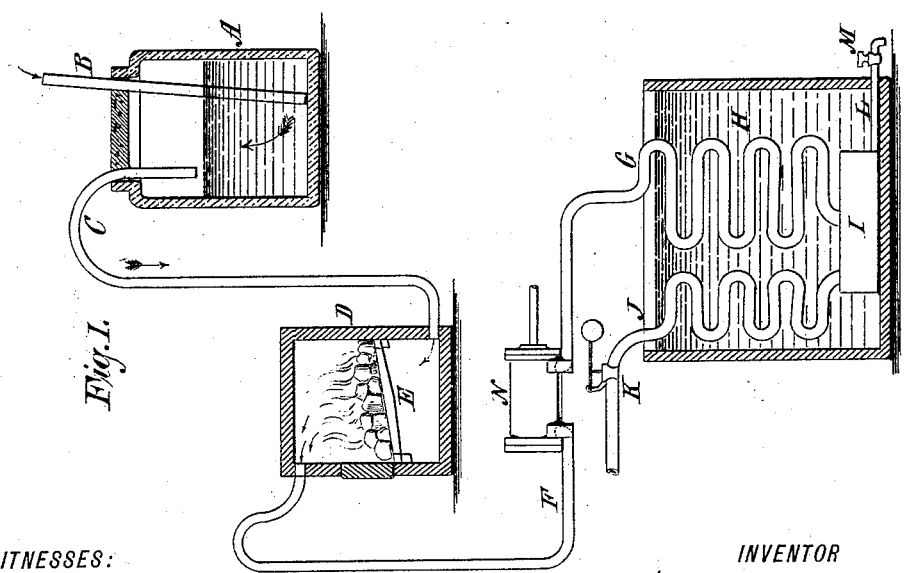
WITNESSES:
INVENTOR
Henry B. Ford
BY
ATTORNEY

UNITED STATES PATENT OFFICE.

HENRY B. FORD, OF NEW YORK, N. Y., ASSIGNOR TO PERKINS & WELSH, OF SAME PLACE.

APPARATUS FOR AND PROCESS OF THE MANUFACTURE OF SULPHUROUS OXIDE.

SPECIFICATION forming part of Letters Patent No. 363,457, dated May 24, 1887.

Application filed October 13, 1886. Serial No. 216,110. (No model.)

*To all whom it may concern:*

Be it known that I, HENRY B. FORD, of the city, county, and State of New York, have invented a new and useful Improvement in Apparatus for and Processes of the Manufacture of Liquid Suphurous Oxide, of which the following is a specification.

My invention relates to apparatus for and processes of the manufacture of sulphurous oxide in liquid form, the said oxide being intended for use as the volatile liquid in refrigerating-machines.

My invention consists in the construction and arrangement of the apparatus, hereinafter more particularly set forth, and in the process of producing the aforesaid liquid in an anhydrous condition by first passing a current of air through sulphuric acid or other material capable of absorbing the water contained in the air, and then causing the air so rendered anhydrous to pass into a furnace and effect the combustion of sulphur therein, the resulting product being sulphurous oxide in gaseous form and nitrogen. The mingled gases are then caused to proceed through a condenser wherein the sulphurous oxide under the influence of pressure and cold, or cold only, is brought to the liquid state, nitrogen being allowed to escape.

In the accompanying drawings, Figure 1 is a diagram of my apparatus for carrying my aforesaid process into practical effect. Fig. 2 is a diagram showing a modification of said apparatus.

Similar letters of reference indicate like parts.

A is a vessel containing sulphuric acid, into which acid enters the air-induction pipe B.

C is a pipe leading from the space above the acid in the vessel A to the lower part of the furnace D and below the grate of said furnace. From the space above the grate E a pipe, F, connects with the condenser-coil G. Said coil is submerged in a cold liquid contained in a tank, H. At the lower part of the condenser is a chamber, I. Leading from said chamber I is a tube, J, which is provided with a valve, K, having a weighted lever, whereby said valve may be set to open at a desired pressure. A pipe, L, extends from the chamber I, and terminates outside the tank H in a faucet or cock, M.

Interposed in the pipe F, between the furnace D and condenser G, is a force-pump, N. (Shown in Fig. 1.) In the apparatus represented in Fig. 2 this pump is omitted, and an exhaust-blower, O, is interposed in the pipe C, between the vessel A and the furnace D.

Air enters the vessel A by the pipe B, and is drawn up through the sulphuric acid by the pump N or exhaust-blower O. In passing through the acid the air becomes freed from any water which may be held in suspension in it, and hence, after proceeding through the pipe C or the pipe C and exhaust-blower it reaches the space below the grate of the furnace in a dry anhydrous state. Upon the grate is placed sulphur, which burns in the air supplied as above described, the oxygen of the air combining with the sulphur to produce sulphurous oxide and the nitrogen being set free. The mingled gases then proceed by the pipe F into the condenser. If the force-pump N is used, as in Fig. 1, the valve K is heavily weighted, so that the gases are compressed in the tubes G and J and chamber I, and the liquefaction is thus assisted. If the fan or exhaust-blower is employed, the valve K is either lightly weighted or not weighted at all, so that the nitrogen may easily escape. The liquefied sulphurous oxide is received in the chamber I, whence it is drawn off by the pipe L and faucet M. The nitrogen passes off by the pipe J, which is made serpentine, so that in traversing the same whatever liquid oxide may be mingled with the nitrogen may be deposited in the pipe, and so flow back into the chamber I.

So far as I am aware it has hitherto been usual to remove water from sulphurous oxide after manufacture. It will be noticed that by my process the moisture is entirely removed from the air before the same meets the sulphur.

I claim—

1. The combination of a means of removing moisture from air, such as the vessel A, containing sulphuric acid, through which the air is passed, a furnace, a pipe for conducting the dried air to said furnace, a pipe for conducting the gaseous products of said furnace to a condenser, a condenser for reducing said gaseous products to the liquid form, and a means—such as a pump or blower—for causing circulation of gas through the aforesaid apparatus, substantially as described.

2. The combination of the vessel A, containing a liquid—such as sulphuric acid—capable of removing water from air conducted through it, pipe C, furnace D, pipe F, tank H, condenser G, chamber I, escape-pipe J, pump N, and valve K, substantially as described.

3. The combination of the vessel A, containing a liquid—such as sulphuric acid—capable of removing water from air conducted through it, furnace D, tank H, condenser G, chamber I, escape-pipe J, connecting-pipes C and F, and a means—such as blower—for causing a circulation of gas through the aforesaid apparatus, substantially as described.

4. The process of producing sulphurous oxide in liquid form, substantially as herein set forth, which consists in, first, removing the water contained in an incoming air-current; second, supplying said current to ignited sulphur, and thereby effecting the combustion of said sulphur; third, condensing the resulting sulphurous oxide into liquid form by the action of a surrounding refrigerating medium or by the action of a surrounding refrigerating medium and pressure.

HENRY R. FORD.

Witnesses:
JAMES S. GREVES,
PARK BENJAMIN.